US006105947A

United States Patent [19]

Dykstra

[11] Patent Number: 6,105,947

[45] Date of Patent: Aug. 22, 2000

[54] LOW PROFILE PNEUMATIC RETRACTOR CLAMP

[75] Inventor: Henry Dykstra, Hartland, Mich.

[73] Assignee: Delaware Capital Formation, Inc., Wilmington, Del.

[21] Appl. No.: 08/916,065

[22] Filed: Aug. 21, 1997

Related U.S. Application Data

[60] Provisional application No. 60/024,819, Aug. 28, 1996.

[51] Int. Cl.[7] .................................................. B23Q 3/08

[52] U.S. Cl. ............................ 269/24; 269/233; 269/157

[58] Field of Search ............................. 269/233, 24, 157

[56] References Cited

U.S. PATENT DOCUMENTS 1,736,171 11/1929 Powell ................................... 269/157
1,948,799 2/1934 Oyster ..................................... 269/157
4,496,138 1/1985 Blatt ........................................ 269/233
5,118,088 6/1992 Sawdon .
5,165,670 11/1992 Sawdon .
5,171,001 12/1992 Sawdon .

*Primary Examiner*—David A. Scherbel
*Assistant Examiner*—Daniel G. Shanky
*Attorney, Agent, or Firm*—Dinnin & Dunn, P.C.

[57] ABSTRACT

A low profile fixture clamp which provides a clamping force in two perpendicular directions through the motion of a pneumatic cylinder in a single plane. The principle component of the clamping force is a horizontal force in-line with the force generated by the pneumatic air cylinder. An additionally vertical downward clamping force is also generated.

20 Claims, 5 Drawing Sheets

LOW PROFILE PNEUMATIC RETRACTOR CLAMP

This is a Continuation of the prior provisional application Ser. No. 60/024,819, filed Aug. 28, 1996.

TECHNICAL FIELD

The invention broadly relates to pneumatic clamps, and more particularly, to a low profile clamp which provides a clamping force in two perpendicular directions through the motion of a pneumatic cylinder in a single plane.

BACKGROUND OF THE INVENTION

Power clamps are frequently used in a wide variety of work stations to forcibly clamp a workpiece in place during any conceivable number of operations necessary for the particular workpiece. A typical clamp includes clamp arms having a range of motion extending substantially outside the perimeter of the clamp body. As a result, the typical clamp requires substantial space to accommodate the motion of the clamp arms during the clamping and releasing of the workpiece. However, work space is routinely limited preventing the use of such typical clamps. Furthermore, even if work space is adequate to accommodate the range of the motion of the typical clamp, the motion may so severely interfere with other operations on the workpiece, necessary before or during the clamping function, that the clamp is rendered inoperable.

Wherefore, it is an object of the present invention to provide a design of a power clamp that minimizes the range of motion for the clamp arms while providing sufficient clamping power.

Another object of the present invention is to provide a design of a power clamp having a low profile to maximize accessibility to a workpiece.

Still another object of the present invention is to provide a design of a power clamp that provides a vertical and horizontal clamping force through the motion of a fluid-actuated cylinder in a single plane.

Additional objects, advantages and novel features of the invention will be set forth in part in the description which follows, and in part will become apparent to those skilled in the art upon examination of the following or may be learned by practice of the invention. The objects and the advantages of the invention may be realized and obtained by means of the instrumentalities and combinations particularly pointed out in the appended claims.

SUMMARY OF THE INVENTION

According to the present invention, the foregoing and other objects and advantages are obtained by a pneumatic clamp generally comprising an air cylinder and a clamp body containing a clevis bracket, a clamp block and a pivot piece. The air cylinder is attached to the clamp body within which the clevis bracket and clamp block are slidingly held. The driven portion of the air cylinder is threadingly attached to the clevis bracket and both are movable along the axis of the air cylinder within the clamp body. The clamp block is held relative to the clevis bracket by pin member slidingly cooperating within slots of the clevis bracket. A clamp arm extends from the clamp block to provide a clamping force in two perpendicular directions through the motion of the clamp arm slidingly held within the pivot piece which is rotatably held within the clamp body.

BRIEF DESCRIPTION OF THE DRAWINGS

FIG. 3 is a longitudinal cross-sectional view of the present invention in a retracted position.

DESCRIPTION OF THE PREFERRED EMBODIMENT(S) AND BEST MODE OF CARRYING OUT THE INVENTION

Figures 1, 2:
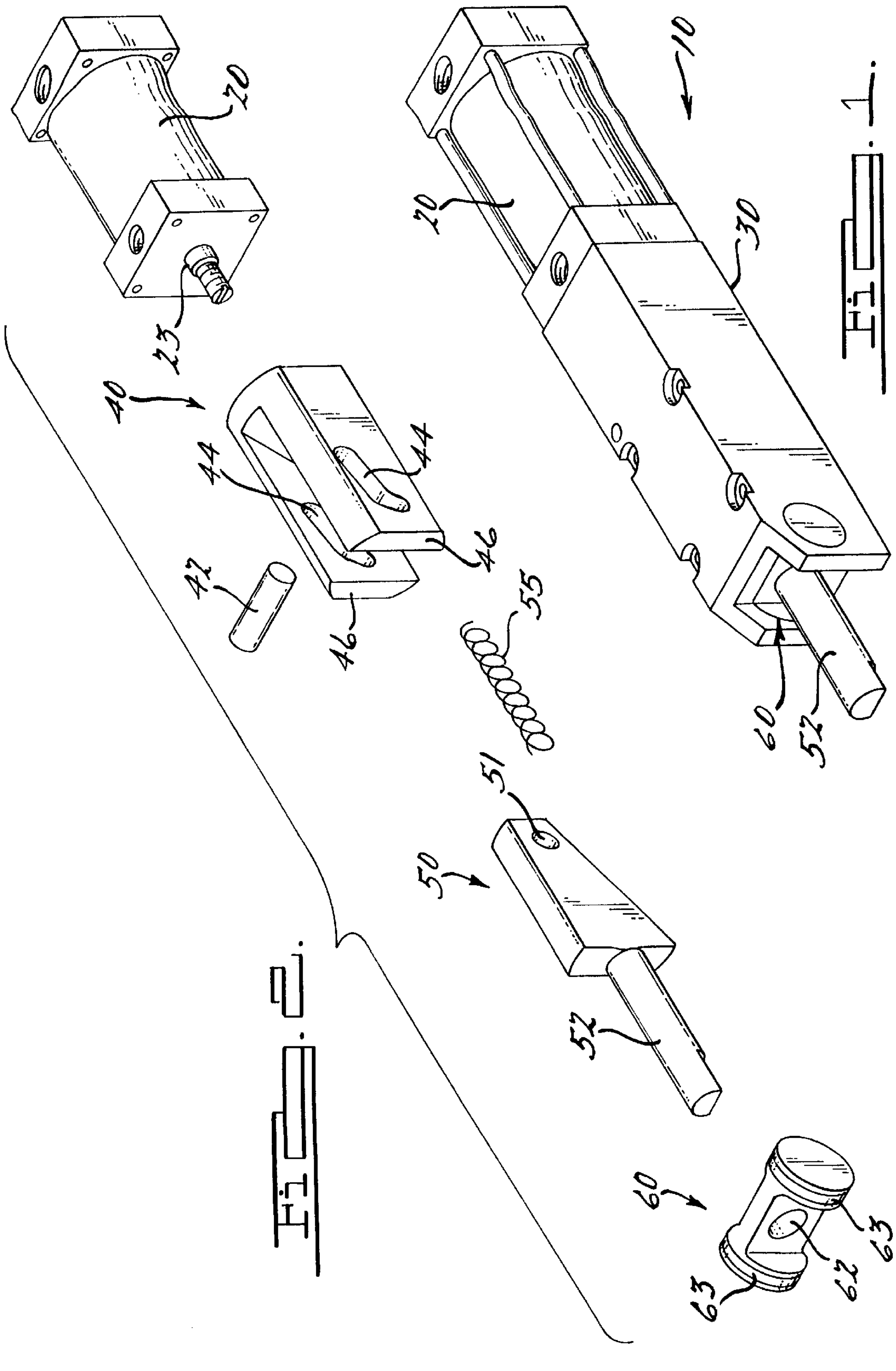
FIG. 1 is a perspective view of a low profile clamp according to the present invention.
FIG. 2 is an exploded view of the present invention excluding the clamp body.

Referring now in greater detail to the drawings, FIG. 1 demonstrates the present invention is a low profile pneumatic clamp 10 which provides a clamping force in two perpendicular directions through the motion of a pneumatic cylinder in a single plane. The principle component of the clamping force is a horizonal force in line with the force generated by the pneumatic air cylinder. An additional vertically downward clamping force is also generated.

The fixture clamp 10, shown in FIG. 1 and FIG. 2, generally comprises an air cylinder 20 and a clamp body 30 containing a clevis bracket 40, a clamp block 50 and a pivot piece 60. The air cylinder 20 is attached to the clamp body 30 within which the clevis bracket 40 and clamp block 50 are slidingly held. The driven portion of the air cylinder 20 is threadingly attached to the clevis bracket 40 and both are movable along the axis of the air cylinder 20 within the clamp body 30. The clamp block 50 is held relative to the clevis bracket 40 by pin member 42 within slots 44 in the arms 46 of the clevis bracket 40. A tension spring 55 is securely positioned between the clevis bracket 40 and clamp block 50 within aligned recesses 47, 57, respectively, to bias each apart. At the end of the clamp block 50 is the clamp arm 52 which has a suitable configuration for clamping the particular work piece, here more particularly shown in FIGS. 5–8, with a simple rectangular configuration for holding the square edge of a typical work piece.

It is understood that a simple clamping pin (not shown) could be used which could be inserted into any number of clamping heads (not shown) which could have a variety of configurations depending on the work piece, including a roughened surface for frictional grip, or resilient surfaces for preserving a finish on a work piece or for softer work pieces. Additionally, it is understood that the clamp could be powered by any fluid actuating means, including pneumatically or hydraulically powered systems.

Figure 9:
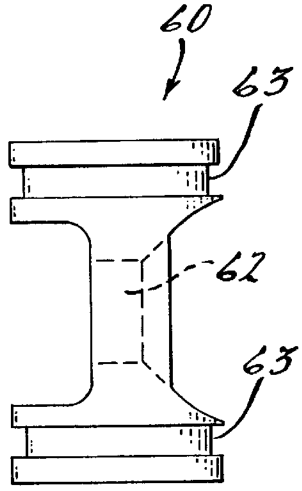
FIG. 9 is a view of the pivot for the present invention.
Figure 10:
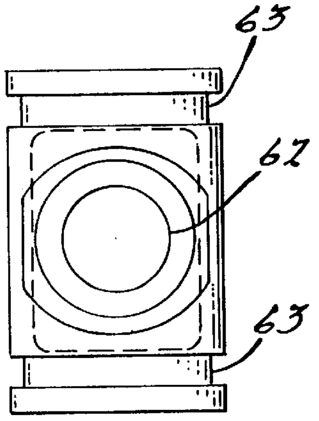
FIG. 10 is a longitudinal view of FIG. 9 rotated 90°.
Figure 11:
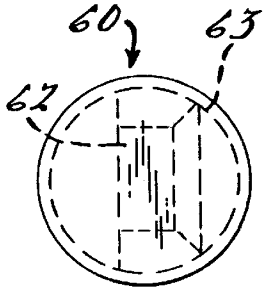
FIG. 11 is a side view of FIG. 9.
Figure 12:
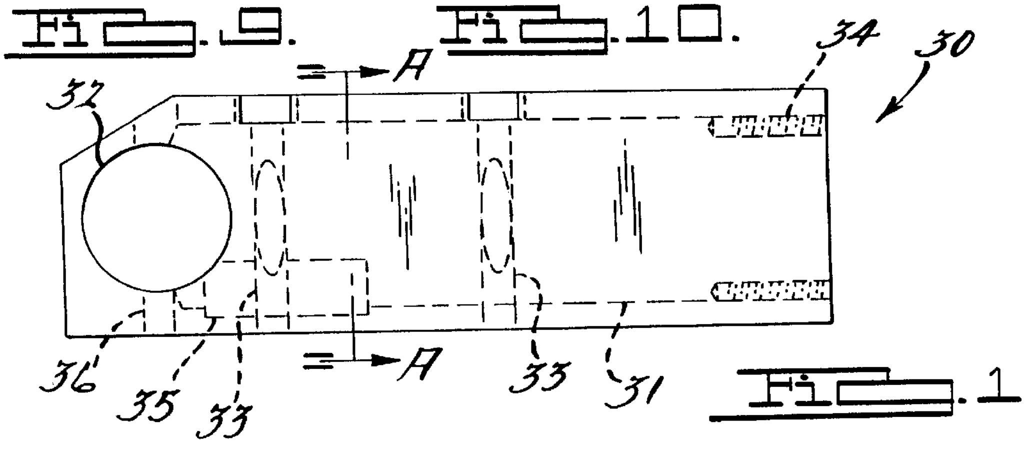
FIG. 12 is a longitudinal side view of the body for the present invention.
Figure 13:
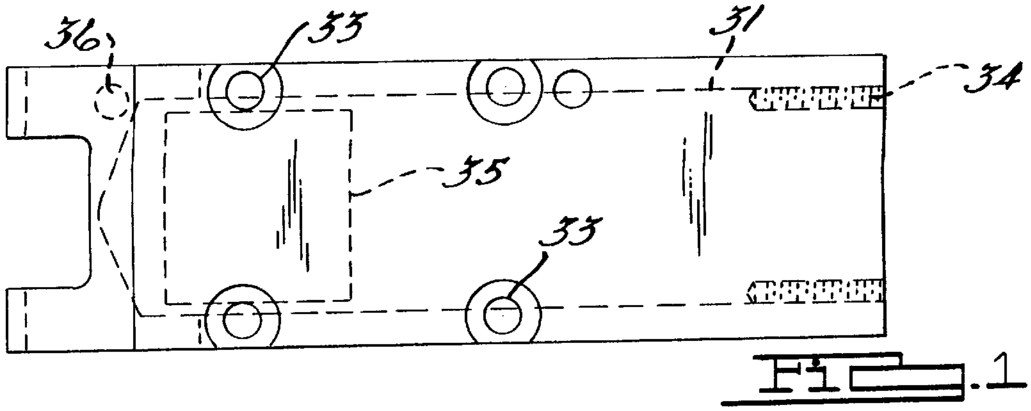
FIG. 13 is a top view of FIG. 12.
Figure 14:
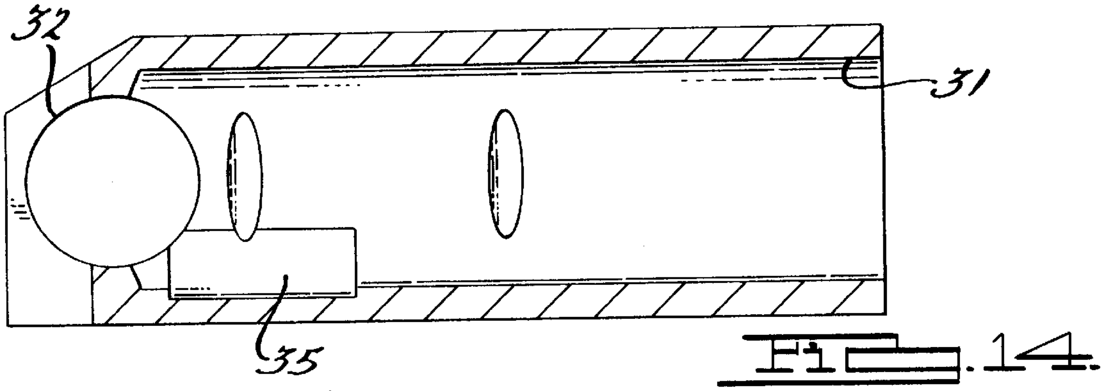
FIG. 14 is longitudinal cross-sectional view of FIG. 12.
Figure 15:
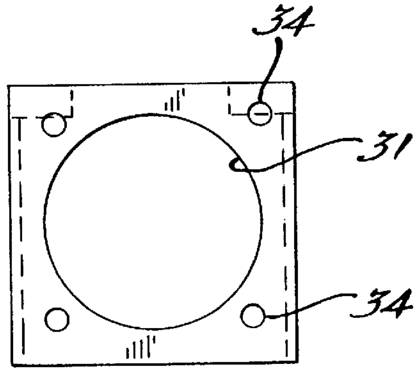
FIG. 15 is a right end view of FIG. 12.
Figure 16:
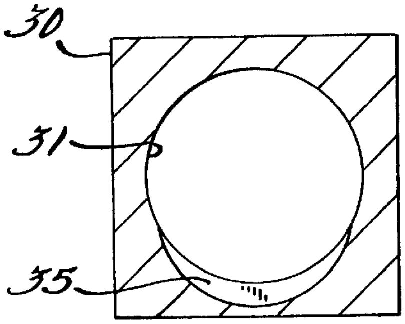
FIG. 16 is a transverse cross-sectional view taken along line A—A of FIG. 12.

As shown in FIG. 3, the clamp arm 52 is slightly angled upwardly of the axis of the motion of the pneumatic cylinder 20, clevis bracket 40 and clamp block 50 when the piston 22 and piston rod 23 are in the retracted position. The clamp arm 52 is slidingly held within a pivot piece 60, more particularly illustrated in FIGS. 9–11, which is rotatably held within the clamp body 30 at the end opposite the pneumatic cylinder 20. As the piston 22 and piston rod 23 move the clevis bracket 40, the clamp block 50 is moved axially within the clamping body 30 once the compressive force of the spring 55 is overcome, causing the clamp arm 52 to advance through the pivot piece 60.

Figure 4:
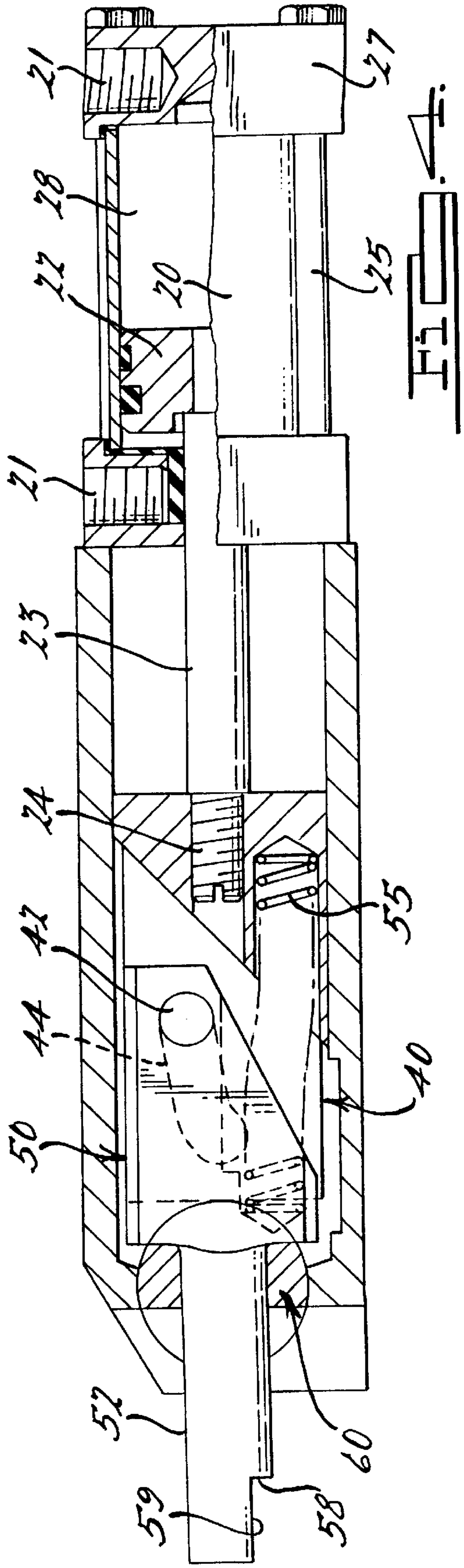
FIG. 4 is a longitudinal cross-sectional view of the present invention in an extended condition.
Figure 5:
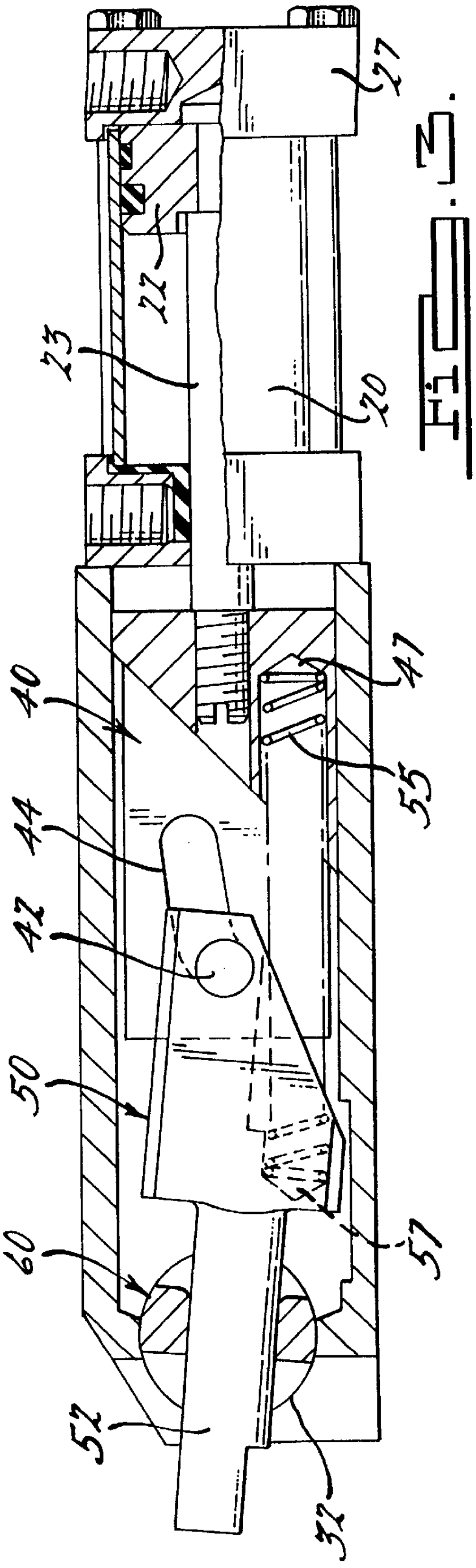
FIG. 5 is a longitudinal side view of the clamp block for the present invention.
Figure 5:
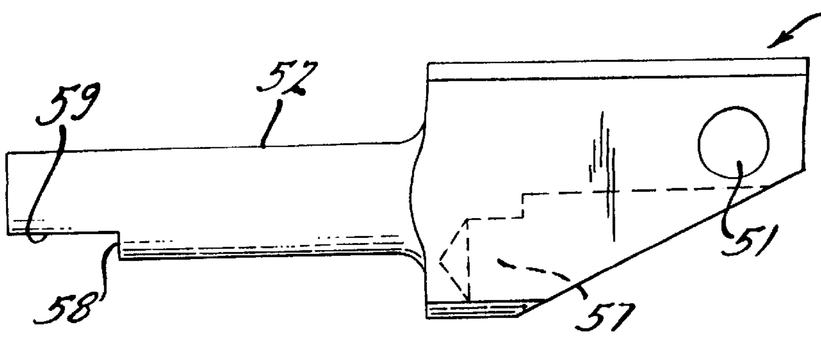
Figure 6:
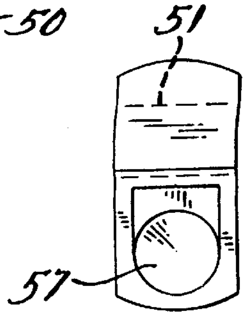
FIG. 6 is a right end view of FIG. 5.
Figure 7:
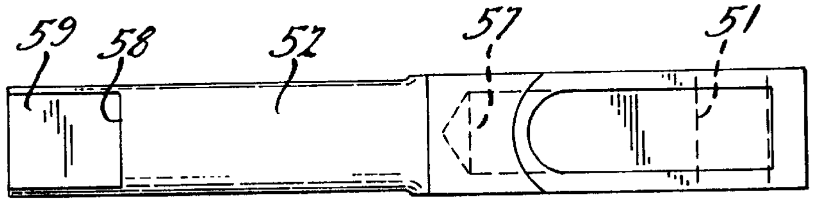
FIG. 7 is a bottom view of FIG. 5.
Figure 8:
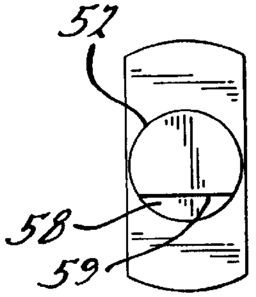
FIG. 8 is a left end view of FIG. 5.

When the vertical clamping surface 58 of the clamp arm 52 (which provides the horizontal clamping force) engages the work piece (not shown), the axial motion of the clamp block 50 is halted. The piston 22 and piston rod 23 continue to advance, advancing the clevis bracket 40 which overcomes the biasing force of the spring 55 and continues to move the clevis bracket 40 relative to the clamp block 50 forcing the pin 42 to ride up through the slots 44 in the arms 46 of the clevis bracket 40. This forces the end of the clamp block 50 upward and to pivot about the pivot piece 60 which causes the end of the clamp arm 52 to pivot vertically downward. The spring 55 is sufficiently resilient to deform under these conditions and the piston 22 and piston rod 23 are adjusted to advance until the pin 42 has traveled to the end of the slots 44, as illustrated in FIG. 4. Although the resultant vertical motion of the clamp arm 52 is only a few thousandths of an inch, this is sufficient clearance for operation and to allow for variation in the work pieces, and sufficient to generate the necessary downward clamping force.

The clamp block 50 is shown in more detail in FIGS. 5–8. The clamp block 50 has an opening 51 to receive pin 42, a longitudinal bore 57 to receive one end of tension spring 55, and a cylindrical clamp arm 52 extending from clamp block 50, said clamp arm 52 having two perpendicularly surfaces 58, 59, respectively. The pivot 60 is shown in more detail in FIGS. 9–11. The pivot has a central portion forming a bore 62 to receive the clamp arm 52, circular ends having grooves 63 to receive the end of a bolt (not shown) threaded through an opening 36 in the clamp body 30 to stabilize the pivot 60 inside the clamp body 30. The pivot is positioned in opening 32 of the clamp body 30 to rotatably cooperate with the clamp body and fluidly seal the end opposite the pneumatic cylinder 20.

The clamp body 30 is shown in more detail in FIGS. 12–16. The clamp body 30 is elongated and rectangular having a bore 31 extending longitudinally, four openings 33 extending from the top through to the bottom of the clamp body 30 to receive bolts (not shown) to secure the clamp body to a work station. The clamp body 30 includes threaded bores 34 to receive the threaded ends 26 of bolts 25 to secure the pneumatic cylinder 20 longitudinally to the end of the clamp body 30. The clamp body 30 also includes a second threaded opening 36 to receive a screw (not shown) threaded into the clamp body 30 and extending into the groove 63 of the pivot 60 to secure the pivot 60 in the opening 32 of clamp body 30. The clamp body 30 also includes a carved out area 35 of the bore 31 to allow more room for the clamp block 50 to pivot as the piston rod 23 drives the clamp block 50.

Figure 17:
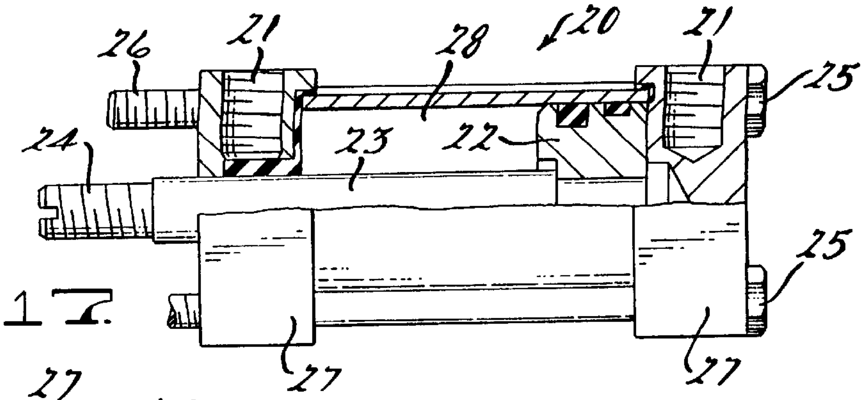
FIG. 17 is a longitudinal side view of the pneumatic cylinder with a partial cross-sectional view.
Figure 18:
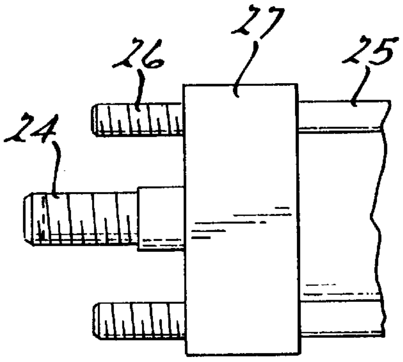
FIG. 18 is a fragmentary side view of FIG. 17.
Figure 19:
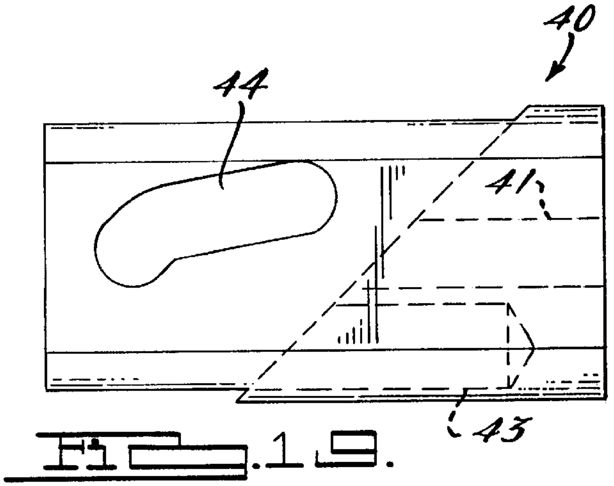
FIG. 19 is a longitudinal side view of the clevis bracket for the present invention.
Figure 20:
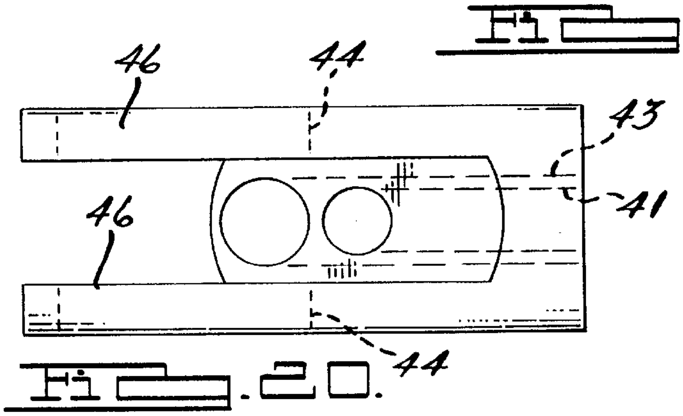
FIG. 20 is a bottom view of FIG. 19.
Figure 21:
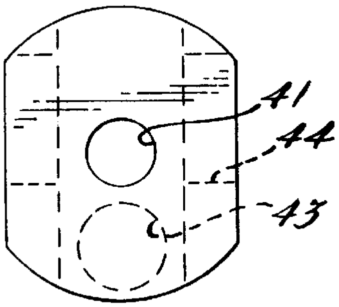
FIG. 21 is a right end view of FIG. 19.
Figure 22:
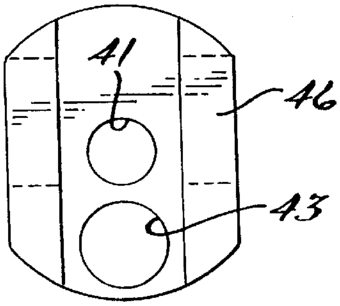
FIG. 22 is a left end view of FIG. 19.
Figure 23:
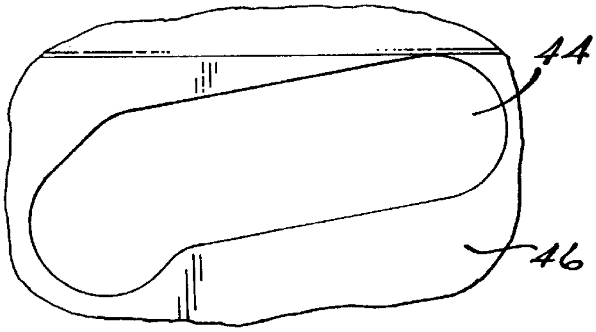
FIG. 23 is a fragmentary view of FIG. 19 more particularly illustrating the slot.

The pneumatic cylinder 20 is shown in more detail in FIGS. 17–18. The cylinder has two fluid ports 21 longitudinally spaced in each cylinder head 27 which are in fluid communication with the fluid chamber 28 within the pneumatic cylinder 20. A piston 22 is securely attached to a piston rod 23 which slidingly cooperating inside the fluid chamber 28 longitudinally. Elongated bolts 25 extend longitudinally through each head 27 and have threaded ends 26. The piston rod 23 also has a threaded end 24.

The clevis bracket 40 is shown in more detail in FIGS. 19–23. The clevis bracket 40 has two arms 46 extending longitudinally and parallel to one another, each arm 46 having slots 44 to receive pin 42, with clevis bracket including a first longitudinal bore 43 to receive one end of tension spring 55 and a second threaded bore 41 to receive the threaded end 24 of the piston rod 23.

The small rectangular body of this power clamp with the pneumatic cylinder extending longitudinally from one end of the body with no greater dimensions than the clamp body, and the range of motion for the clamp arm not extending outside the longitudinal perimeter of the clamp body provides for a very low profile power clamp which greatly improves the accessibility of the workpiece to any tooling or other machining operations. Furthermore, the clamp body with the ends enclosed by the pneumatic cylinder and pivot piece at the opposite end seals the clamp body adequately enough to hold lubricating grease without the necessity of lubrication being provided through the fluid actuating means. This provides a clamp body bore with a clean environment preventing failure and the necessity of continued maintenance for the power clamp.

Figure 24:
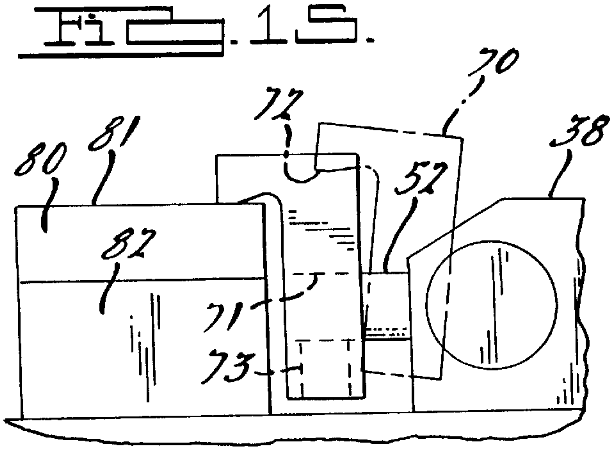
FIG. 24 is a fragmentary pictorial view of a second embodiment of the present invention illustrating a clamp adaptor.
Figure 25:
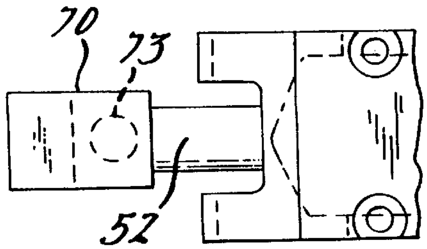
FIG. 25 is a top view of the clamp adaptor of FIG. 24 secured to the clamp arm of the present invention.

An alternate embodiment of the present invention is a low profile clamp shown in FIGS. 24 and 25, whereby a modified clamping adaptor 70 is slidingly cooperating with clamp arm 52 at opening 71 and securely attached by a screw or bolt (not shown) positioned through a second opening 73 and into the clamp arm 52. The clamping adaptor 70 has a horizontal clamping surface 72 (which provides the vertical clamping force on the workpiece 80 in FIG. 24) which is positioned at or above the top horizontal surface 38 of the clamp 10 and the top horizontal surface 81 of the workpiece 80 which is also situated at or above the top horizontal surface 38 of the clamp 10. The workpiece 80 is located at or above the clamp surface 38 by raising the fixture holding the work piece, by lowering the position of the clamping mechanism, or by providing a work piece riser 82 as shown in FIG. 24. In this configuration, the only portion of the entire clamping mechanism which is exposed above the work piece surface 81 is the adaptor 70, which greatly improves the accessibility of the work piece 80 to any tooling or other machining operations.

What is claimed is:

1. A low profile clamp comprising:

an elongated clamp body with at least one flat surface, said clamp body having a longitudinal bore;

a cylinder having a fluid chamber therein and removably attached to said clamp body along the longitudinal axis, said cylinder including a pair of fluid ports longitudinally spaced from one another in fluid communication with said fluid chamber;

a clevis bracket slidingly held within the bore of said clamp body, said clevis bracket including two arms extending longitudinally, each arm having a slot opposing and parallel to the other, said slots angled relative to the longitudinal motion of said clevis bracket, said clevis bracket further including a first longitudinal opening;

a piston rod longitudinally disposed in said bore and having a first end removably secured to said clevis bracket;

a piston removably attached to the piston rod opposite the first end, said piston is sealingly disposed for slidable, longitudinal movement within said fluid chamber between said fluid ports in order to selectively extend and retract said piston rod longitudinally in response to respective greater and lesser fluid pressures in one of said fluid ports with respect to the other of said fluid ports;

a clamp block slidingly held within the bore of said clamp body, said clamp block having a first end with pins slidingly held within the slots of said clevis bracket, said clamp block including a clamp arm extending from a second end and a portion protruding outside the clamp body, said clamp block further including a second longitudinal opening;

a tension spring securely held in said first and second openings of said clamp block and clevis bracket to force both longitudinally apart; and a pivot rotatably held inside the clamp body and sealing the bore at the end of said clamp body opposite the cylinder, said clamp arm is slidingly held in said pivot perpendicular to the rotation axis.

2. The low profile clamp of claim 1 wherein said piston is pneumatically powered.

3. The low profile clamp of claim 1 wherein said clamp arm includes a vertical and horizontal clamping surface.

4. The low profile clamp of claim 1 further including a clamp adaptor removably secured to said clamp arm, said clamp adaptor having a horizontal clamping surface which is at a predetermined distance relative to the surface of the clamp body.

5. A low profile clamp comprising:

a cylinder defining a fluid chamber for reciprocating a piston therein, said piston connected to a piston rod extending from said cylinder;

a clamp body axially aligned and secured to said cylinder, said clamp body defining a longitudinal bore with a first end receiving said piston rod;

a clevis bracket slidingly held in the longitudinal bore of said clamp body and secured to said piston rod, said clevis bracket having two arms extending axially away from said piston rod and each arm including a slot symmetrically opposing the other and angled at least once relative to the longitudinal axis of said bore;

a clamp block having a first end with a transverse opening to receive a pivot pin, the ends of said pivot pin slidingly cooperating in said slots of the clevis bracket, a second end of the clamp block defining a clamp arm projecting from the longitudinal bore at a second end of the clamp body; and a biasing means to force the clevis bracket and clamp longitudinally block apart inside the longitudinal bore, said clamp block having at least one surface to halt the longitudinal motion of the clamp block.

6. The low profile clamp of claim 5 wherein said cylinder and clamp body have generally the same cross sectional dimensions and said clamp body has generally a square cross-section.

7. The low profile clamp of claim 5 wherein said biasing means is a tension spring having ends secured in generally opposed openings in said clevis bracket and clamp block, the orientation of said tension spring is below the longitudinal axis with the tension spring and longitudinal axis establishing a vertical plane relative to the clamp body, said tension spring a pre-determined distance from the pivot pin of said clamp block to pivot the clamp block and angle the clamp arm relative to the longitudinal axis.

8. The low profile clamp of claim 5 wherein said clamp arm has a range of motion within the cross-sectional dimensions of the clamp body.

9. The low profile clamp of claim 7 wherein the surface to halt the longitudinal motion of the clamp block is a first surface oriented generally perpendicular to a longitudinal axis of the clamp arm and said first surface positioned outside the clamp body, said clamp arm further including a horizontal surface adjacent the first surface to provide a downward clamping force.

10. The low profile clamp of claim 5 further including a seal pivot rotatably secured at the second end of the clamp body and fluidly sealing this end of the longitudinal bore, said seal pivot further including a central portion with an opening aligned to receive the clamp arm, said seal pivot rotates about a transverse axis of the bore, and said cylinder fluidly seals the longitudinal bore at the first end of the clamp body.

11. The low profile clamp of claim 10 wherein the seal pivot further including cylindrical ends with the center of each end establishing the transverse axis on which the seal pivot rotates, said cylindrical ends having peripheral grooves with at least one groove receiving an end of a bolt secured inside the clamp body to stabilize the seal pivot at the second end of the clamp body.

12. The low profile clamp of claim 9 wherein the slots in said clevis bracket are positioned generally above a plane passing through the longitudinal axis and horizontal relative to the clamp body, and said slots establishing parallel planes perpendicular to said horizontal plane, said slots each having a first end nearer the cylinder and a greater distance from the longitudinal axis then the second end, each slot establishes two angles relative to said horizontal plane.

13. The low profile clamp of claim 12 having a release position established by the clevis bracket generally adjacent the first end of the clamp body, the tension spring forcing the clevis bracket and clamp block longitudinally apart with the pivot pin ends positioned in the second end of the slots and the clamp arm angled upward relative to the longitudinal axis of the bore.

14. The low profile clamp of claim 12 having a clamp position established by the pivot pin ends positioned in the first end of the slots to pivot the clamp arm generally downward relative to the longitudinal axis.

15. A low profile clamp comprising:

a cylinder defining a fluid chamber for reciprocating a piston therein, said piston connected to a piston rod extending from said cylinder;

a clamp body axially aligned and secured to said cylinder, said clamp body defining a longitudinal bore with a first end receiving said piston rod;

a clevis bracket slidingly held in the longitudinal bore of said clamp body and secured to said piston rod, said clevis bracket having two arms extending axially away from said piston rod and each arm including a slot symmetrically opposing the other and angled at least once relative to the longitudinal axis of said bore;

a clamp block having a first end with a transverse opening to receive a pivot pin, the ends of said pivot pin slidingly cooperating in said slots of the clevis bracket, a second end of the clamp block defining a clamp arm projecting from the longitudinal bore at a second end of the clamp body;

a biasing means to force the clevis bracket and clamp block longitudinal apart inside the bore, said clamp block having at least one surface to halt the longitudinal motion of the clamp block; and a seal pivot rotatably secured at the second end of the clamp body and fluidly sealing this end of the longitudinal bore, said seal pivot further including a central portion with an opening aligned to receive the clamp arm, said seal pivot rotates about a transverse axis of the bore, and said cylinder fluidly seals the longitudinal bore at the first end of the clamp body.

16. The low profile clamp of claim 15 wherein said biasing means is a tension spring having ends secured in generally opposed openings in said clevis bracket and clamp block, the orientation of said tension spring is below the longitudinal axis with the tension spring and longitudinal axis establishing a vertical plane relative to the clamp body, said tension spring a pre-determined distance from the pivot pin of said clamp block to pivot the clamp block and angle the clamp arm relative to the longitudinal axis.

17. The low profile clamp of claim 15 wherein the surface to halt the longitudinal motion of the clamp block is a first surface oriented generally perpendicular to a longitudinal axis of the clamp arm and said first surface positioned outside the clamp body, said clamp arm further including a horizontal surface adjacent the first surface to provide a downward clamping force.

18. The low profile clamp of claim 15 wherein the seal pivot further including cylindrical ends with the center of each end establishing the transverse axis on which the seal pivot rotates, said cylindrical ends having peripheral grooves with at least one groove receiving an end of a bolt secured inside the clamp body to stabilize the seal pivot at the second end of the clamp body.

19. The low profile clamp of claim 17 wherein the slots in said clevis bracket are positioned generally above a plane passing through the longitudinal axis and horizontal relative to the clamp body, and said slots establishing parallel planes perpendicular to said horizontal plane, said slots each having a first end nearer the cylinder and a greater distance from the longitudinal axis then the second end, each slot establishes two angles relative to said horizontal plane.

20. The low profile clamp of claim 19 having a clamp position established by the pivot pin ends positioned in the first end of the slots to pivot the clamp arm generally downward relative to the longitudinal axis and a release position established by the clevis bracket generally adjacent the first end of the clamp body, the tension spring forcing the clevis bracket and clamp block longitudinally apart with the pivot pin ends positioned in the second end of the slots and the clamp arm angled upward relative to the longitudinal axis of the bore.

* * * * *